United States Patent [19]

Dawson

[11] Patent Number: 4,727,961

[45] Date of Patent: Mar. 1, 1988

[54] HUNTING TREE STAND

[76] Inventor: Howard D. Dawson, Rte. 2, Box 657, High Point, N.C. 27260

[21] Appl. No.: 879,785

[22] Filed: Jun. 27, 1986

Related U.S. Application Data

[63] Continuation-in-part of Ser. No. 654,398, Sep. 26, 1984, abandoned.

[51] Int. Cl.[4] ............................ A45F 3/26; A47C 9/10
[52] U.S. Cl. .................................... 182/187; 108/152
[58] Field of Search .................. 182/187, 188; 108/152

[56] References Cited

U.S. PATENT DOCUMENTS

| | | | |
|---|---|---|---|
| 305,100 | 9/1884 | Moore | 182/187 |
| 3,232,664 | 2/1966 | McBride | 182/187 |
| 3,241,734 | 3/1966 | Gray | 182/187 |
| 3,340,828 | 9/1967 | Smith | 182/187 |
| 3,368,725 | 2/1968 | Martin | 182/187 |
| 3,392,802 | 7/1968 | Moore | 182/187 |
| 3,419,108 | 12/1968 | Mobbs | 182/187 |
| 3,460,649 | 8/1969 | Baker | 182/187 |
| 3,513,940 | 5/1970 | Ussery | 182/187 |
| 3,730,294 | 5/1973 | Thurmond | 182/187 |
| 3,871,482 | 3/1975 | Southard | 182/187 |
| 3,949,835 | 4/1976 | Butler | 182/187 |
| 4,236,602 | 12/1980 | Leggett | 182/187 |

*Primary Examiner*—Reinaldo P. Machado

*Attorney, Agent, or Firm*—Griffin, Branigan & Butler

[57] ABSTRACT

A portable, foldable tree stand (10) upon which a hunter may be seated. The tree stand has a vertical rigid back support member (11) with means (22) for releasably securing the back support member to a tree trunk (20). A seat (23) is pivotally mounted to the back support member (11) intermediate its length and movable from a vertical to a horizontal position to support a hunter in a seated position. A foldable (50) footrest pivotally depends from the seat (23) with the seat (23) being provided with pivotable bracing means (40) releasably connected to the back support member, and footrest bracing means pivotally connected to the seat (23) and to the footrest (50). Flexible, adjustable web strap means (13,18) are secured to the back support member to encircle a tree trunk (20) and to encircle the torso of a hunter seated in the seat. In a second embodiment, a seat (104) pivots about an axis (125) such that the seat (104) travels over the top portion of a vertical back member (102) to alternate between an open configuration and a closed configuration. A foldable footrest (106) depends from the vertical back member (102) to support the feet of a hunter below the seat member. In a third embodiment, the vertical back member (102) of the second embodiment is lengthened to accommodate a backrest (200).

5 Claims, 14 Drawing Figures

HUNTING TREE STAND

BACKGROUND OF THE INVENTION

This is a continuation-in-part application of U.S. Patent of now abandoned application Ser. No. 06/654,398 filed on Sept. 26, 1984, and entitled "Hunting Tree Stand".

FIELD OF THE INVENTION

This invention relates to an apparatus for supporting a hunter at an elevated position above the ground in a sitting or standing position for hunting game below.

PRIOR ART AND OTHER CONSIDERATIONS

Many types of foldable tree supporting stands for hunters have been developed in which a seat and stand combination may be suitably supported to a tree at any elevation above the ground to enable a hunter to be seated comfortably while awaiting the presence of game below. A partial listing of U.S. Pat. Nos. showing varieties of tree stands include the following: 305,100; 3,241,734; 3,340,828; 3,368,725; 3,392,802; 3,419,108; 3,460,649; 3,493,080; 3,513,940; 3,730,294; and 3,871,482.

Although the prior art exhibits many advantageous features of a foldable tree stand, there are numerous inadequacies in the foldable units, the portability, and the leg and footrest positions.

An object of the present invention is to provide a foldable tree stand that may be securely fastened to a tree at a suitable elevation that is provided with a seat, a backrest, and a footrest, all of which are foldable into a compact unit that is light in weight and highly durable, and capable of withstanding inclement weather.

Another object of the present invention is to provide a compact, portable, lightweight tree stand that will support the hunter in a seated position while providing means for supporting the legs of the hunter while in a seated position for increased comfort.

Another object of the present invention is to provide a tree stand that may be readily secured to a tree and removed therefrom with a minimum of effort.

Other objectives and many of the attendant advantages of this tree stand will become more readily apparent to those skilled in the hunting art from a detailed description and the appended claims in which equivalents are contemplated.

SUMMARY

A foldable tree stand for hunters in which a vertical back member is positioned against a tree and supported at a suitable elevation by means of adjustable tree-encircling straps mounted to the back member. A foldable seat member is pivotally supported to the back member to extend horizontally, to which seat member bracing supports depend and releasably join to the back member as bracing supports for said seat member. In a first embodiment a foldable footrest depends from the seat member to support the feet of a hunter below the seat member. In a second embodiment, a seat pivots about an axis such that the seat travels over the top portion of a vertical back member to alternate between an open configuration and a closed configuration. A foldable footrest depends from the vertical back member to support the feet of a hunter below the seat member. In a third embodiment, the back member of the second embodiment is lengthened to accommodate a backrest.

DETAILED DESCRIPTION OF THE DRAWINGS

Figure 2:
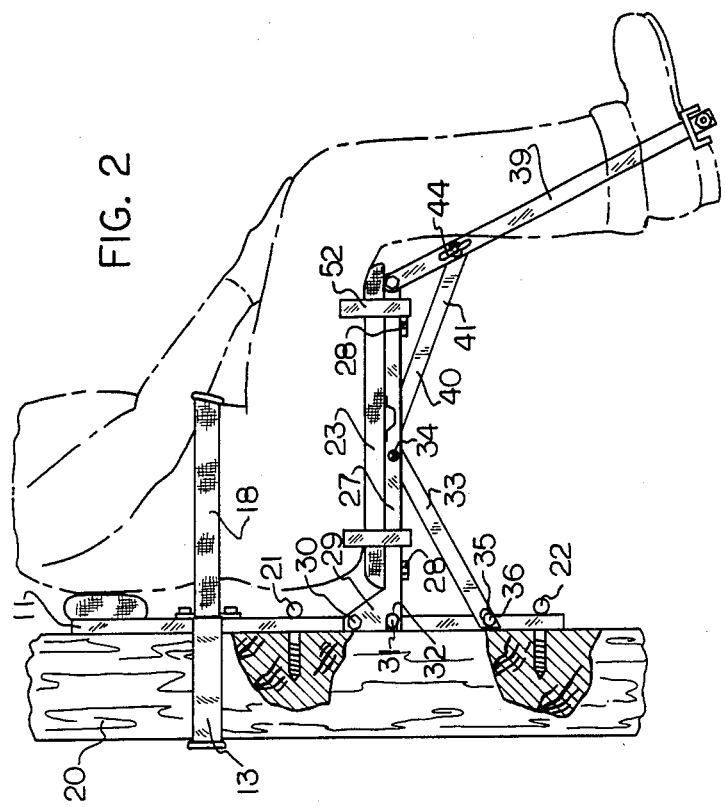
FIG. 2 is a side view of the hunting tree stand of FIG. 1 illustrating, in outline, a hunter in position with the tree stand mounted to a tree.
Figure 1:
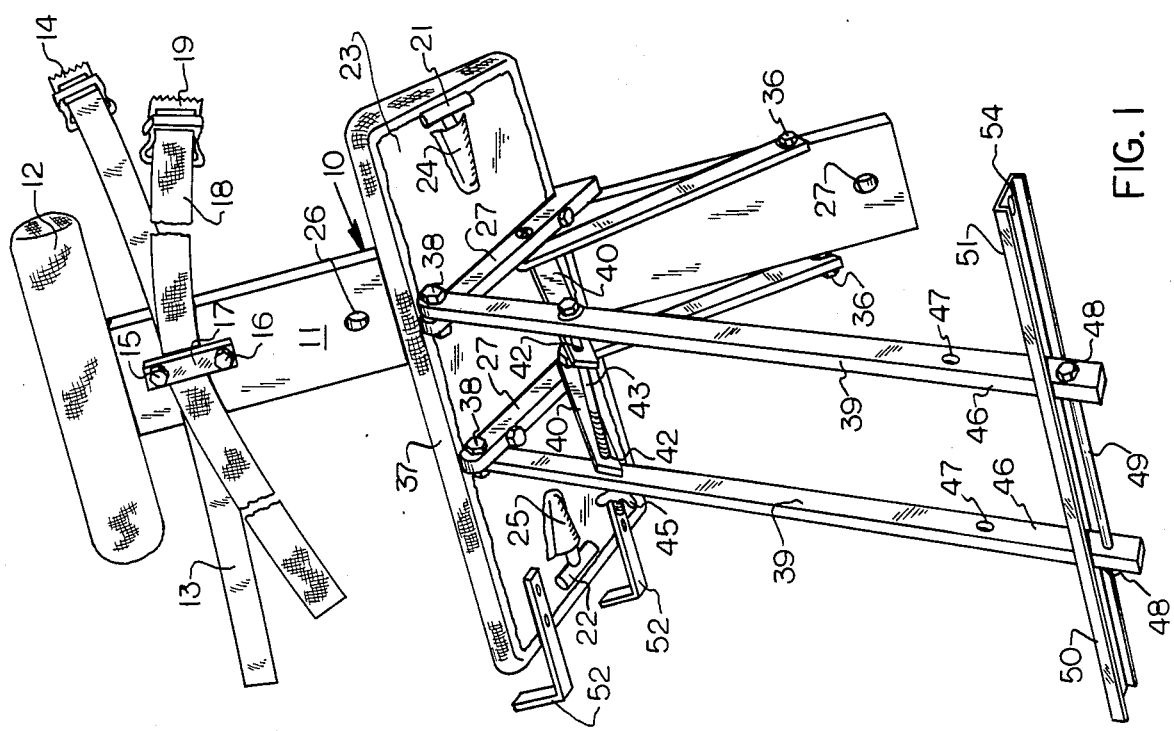
FIG. 1 is a front perspective view of a hunting tree stand according to a first embodiment of my invention in the open and extended position.

Referring to FIGS. 1 and 2, there is illustrated a hunter's foldable tree stand 10 in which a vertical back member 11 is preferably constructed of a solid aluminum extrusion that extends vertically and has a padded upper back rest 12 secured at the upper end. The first flexible tree-encircling web belt 13 having a web belt clamping buckle 14 is secured against the back member 11 through studs 15 and 16 that retain a bar strap clamp member 17 through which belt member 13 extends. A second flexible web belt member 18 having a releasable clamping buckle 19 is also secured by the belt clamping member 17 for encircling the torso of the hunter as shown in FIG. 2. Belt 13 encircles the tree trunk 20 at a appropriate elevation. A pair of T-handle screws 21 and 22 are retained beneath a padded seat member 23 in retaining pockets 24 and 25 with each of the T-handle screws 21 and 22 being removable for securely attaching vertical back member 11 against the tree trunk 20 through back member openings 26 and 27 that are vertically spaced from each other in a position as shown in FIG. 2.

Padded seat 23 is pivotally secured to the vertical back member 11 at its sides through seat frame members 27 that are laterally spaced from each other and to which seat 23 is secured by means of bolts 28. The seat frame members 27 are each provided with an upwardly extending boss 29 through each of which a securing bolt 30 retains the seat and frame in a pivotable position. Bolt 31 on each side of the back member 11 is secured in position to cooperatively receive open end slot 32 formed in the lower portion of the seat supporting members, permitting the seat 23 to be positioned in a hoizontal plane in a position shown in FIG. 2 while enabling the seat to be pivoted upwardly about the pivot bolt 30 upon disengagement of the open slot 32 from bolt 31.

A pair of seat bracing links 33 are pivotally supportd intermediate the length of the seat frame members 27 through securing bolts 34 with the outer terminal ends 35 of each link 33 being provided with an open end slot for cooperatively and releasably receiving a stud 36 secured to the sides of the back member 11 above the T-handle screw 22 as shown in FIG. 1.

At the front end 37 of the seat 23, the forward portions of the seat frame members 27 extend to cooperatively and pivotally support through bolts 38, a pair of downwardly depending footrest supporting rail members 39 which are held in a downward and inclined position, as shown in FIG. 2, by means of rail supporting links 40, each of which is pivotally secured through the securing bolt 34 on the seat supporting members 27 with the outer free ends 41 being provided with bolt-receiving openings 42 through which an elongated threaded bolt 43 extends and passes through openings 44 in the depending footrest rails 39 for retaining the footrest rails 39 in the inclined position shown in FIG. 2. Wing nut 45 threadably engages the elongated bolt 43 for ease of connection and removal to permit folding or extension of the rail members 39. At the lower ends 46 of the rails 39, are pairs of openings, 47 and 48 that are vertically spaced from each other for cooperatively receiving an elongated footrest supporting bolt 49 over which footrest supporting channel 50 may be positioned through elongated slots (not shown) in web 51, enabling the footrest to be raised or lowered on the rail members 39 to the position located when the bolt 49 is placed into the openings 47.

A pair of laterally spaced-apart L-shaped angle irons 52 are secured by screws or other fastening means to the bottom of seat 23 to support a rifle or bow.

Figure 3:
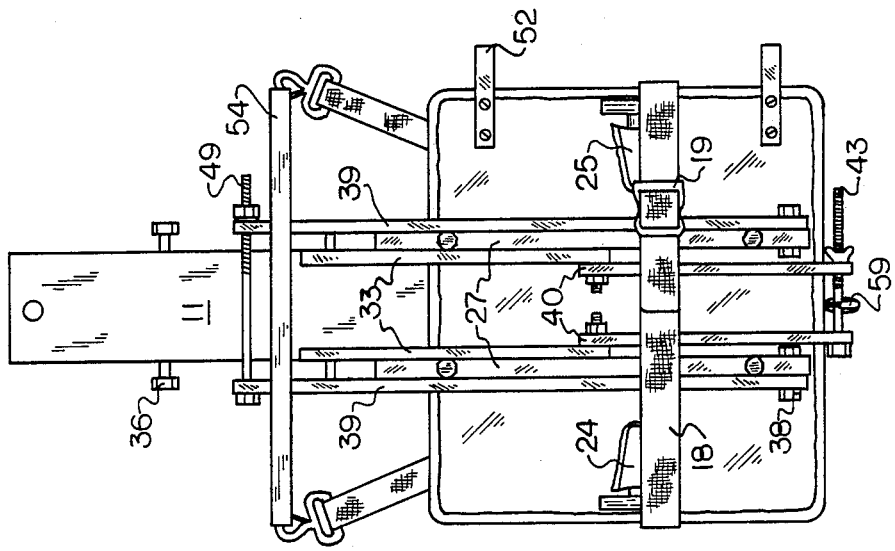
FIG. 3. is a top plan view of the hunting tree stand of FIG. 1 in a folded condition.
Figure 4:
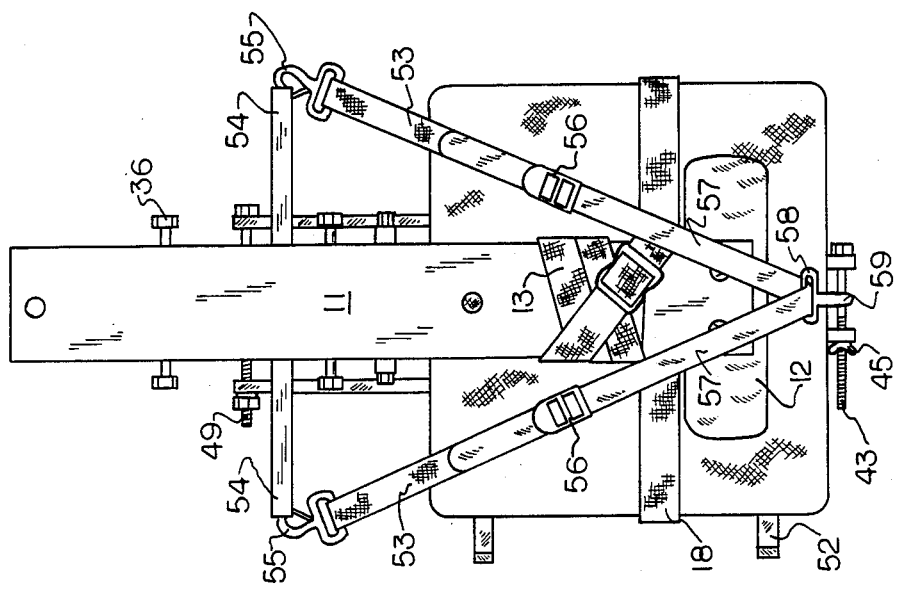
FIG. 4 is a bottom plan view of FIG. 4.
Figure 5:
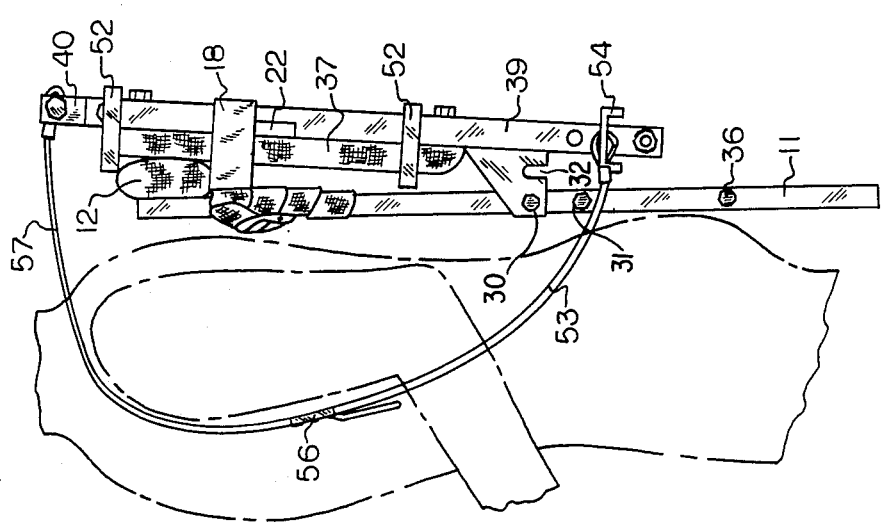
FIG. 5 is a right side view of FIG. 4 of the hunting tree stand mounted for carrying by sling in the folded condition on the back of a hunter.
Figure 6:
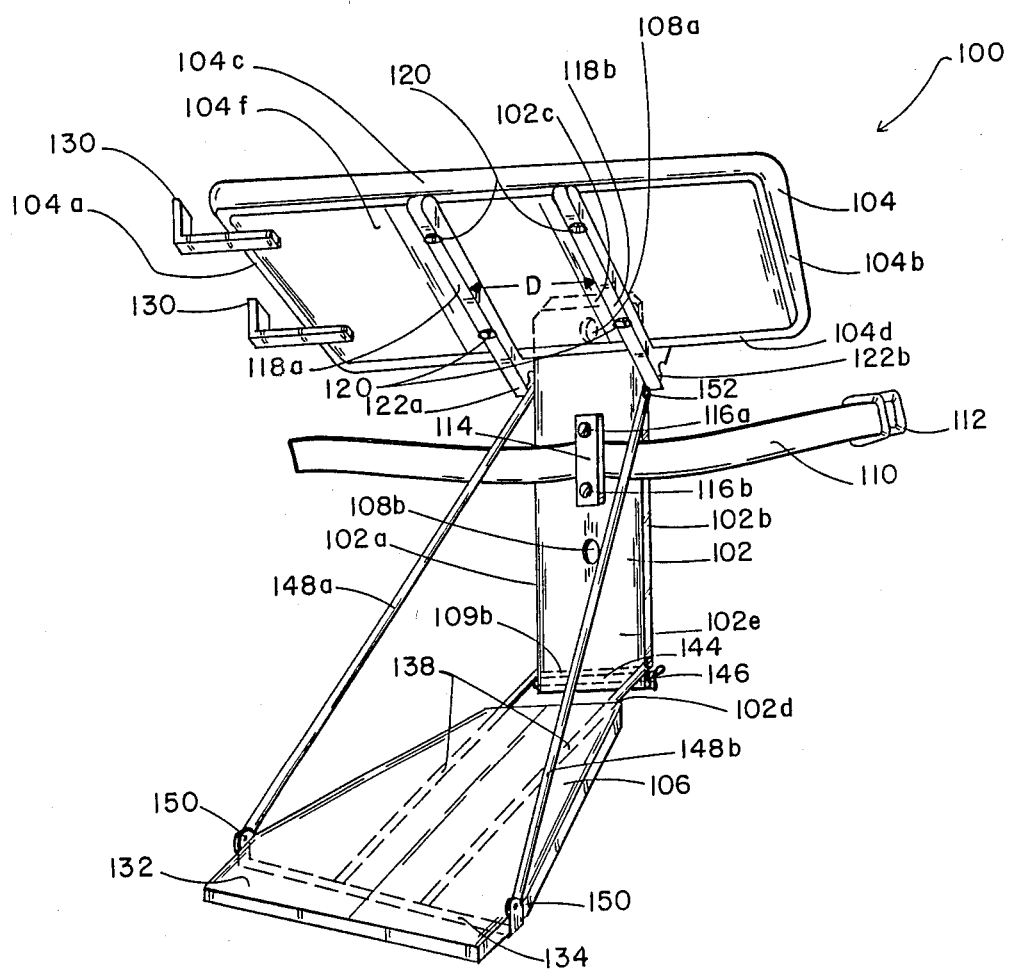
FIG. 6 is a front perspective view of a hunting tree stand in an open position according to a second embodiment of the invention.
Figure 7:
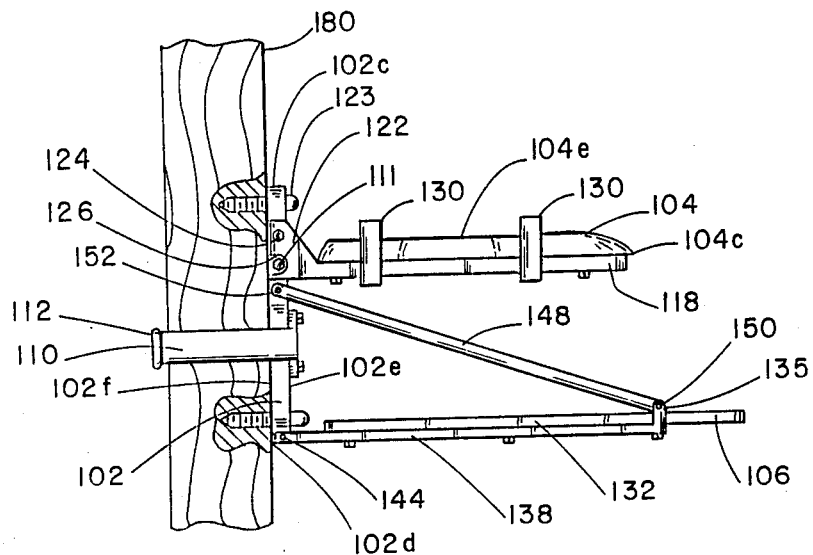
FIG. 7 is a side view, partially sectioned, showing the hunting tree stand shown in FIG. 6 installed on a tree.
Figure 8:
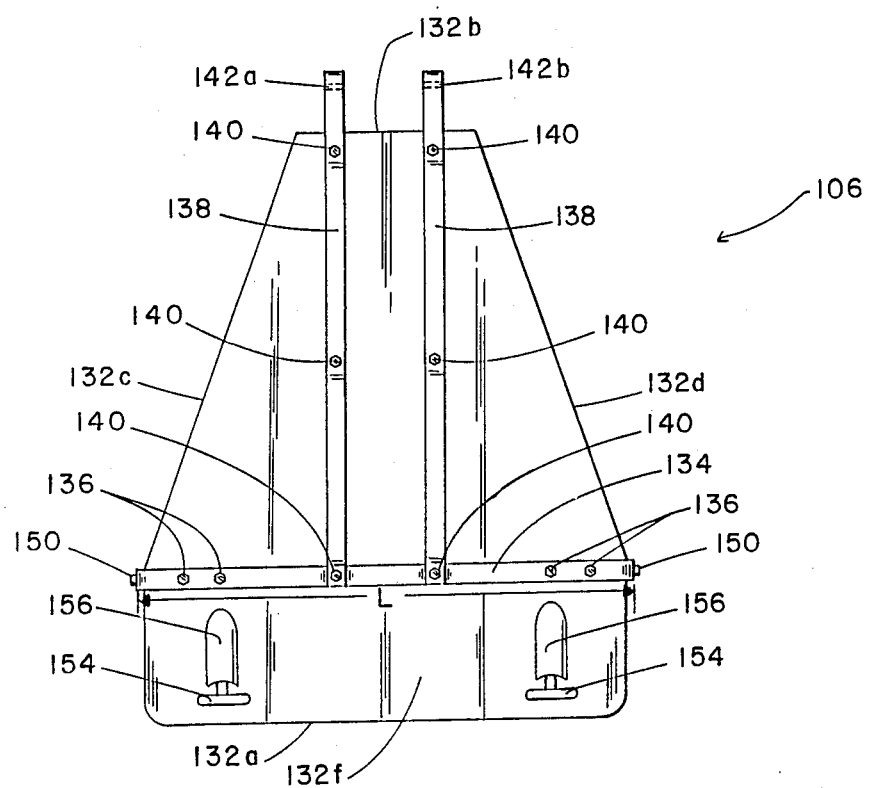
FIG. 8 is a bottom view of a footrest used in the hunting tree stand of the embodiment of FIG. 6.

In the folded or collapsed condition shown in FIGS. 3-5, the foldable tree stand may be carried on the back of the hunter means of flexible and adjustable sling straps 53, which are secured to openings 54 in the ends of the footrest supporting channel 50 through spring snap buckles 55 secured to the ends of the straps 53. Intermediate adjustable buckles 56 are mounted on the straps 53 for sling adjustment. Opposite ends 57 of the straps 53 are secured together at joint 58 to which is mounted a spring snap buckle 59 to be releasably connected to elongated bolt 43 which passes through the rail supporting links 40 to retain the sling straps 53 and maintain the tree stand in a folded or collapsed condition for carrying or storage.

FIGS. 6-9 illustrate a second embodiment of the invention wherein a foldable hunting tree stand 100 comprises a vertical back member 102, a seat 104 and a footrest 106.

Vertical back member 102 (FIG. 6) is manufactured from any suitable material, such as solid aluminum extrusion. The back member 102 has a first side 102a, a second side 102b, a first edge 102c, a second edge 102d, a front surface 102e and a rear surface 102f. A first back member opening 108a extends through the surface of the vertical back member 102 approximately mid-way between side 102a and 102b and is proximate the first edge 102c. Similarly, a second back member opening 108b extends through the surface of the vertical back member 102 mid-way between the sides 102a and 102b and is proximate the second edge 102d.

A first attachment point is provided in the back member 102. The first attachment point, also known as a seat attachment point, is in the form of a Hole 109a (FIG. 9) which extends through back member 102 between side 102a and side 102b. The first attachment point is distanced away from the first edge 102c of the back member 102 by a distance H (see FIG. 11). The distance H is selected so as to allow the seat 104, pivoting about an axis 125, to travel over the first edge 102c of the back member 102. A stopping means, such as bolts 111, is provided in the sides 102a, 102b a predetermined distance below the hole 109a.

A second attachment point, also known as a footrest attaching point is provided in the back member 202. The footrest attaching point, is in the form of a hole 109b which extends through back support member 102 between sides 102a and 102b for pivotally attaching the footrest 106.

A tree-encircling means, such as web belt 110, having a web belt clamping buckle 112 is secured against the vertical back member 102 by a bar strap clamp member 114. The clamp member 114 is secured to the back member 102 approximately half-way between the two edges 102c, 102d by any suitable means, such as screws 116a, 116b. Belt 110 is thus sandwiched between vertical back member 102 and clamp member 114.

Figure 11:
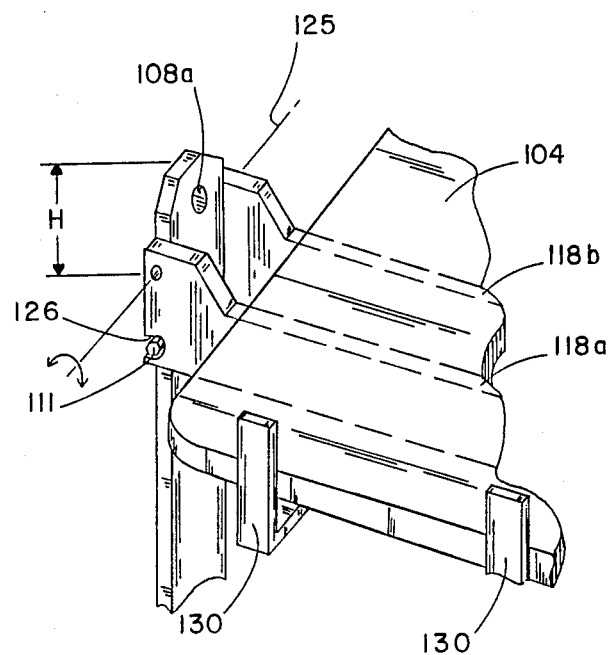
FIG. 11 is a perspective view of a portion of the hunting tree stand of FIG. 6, showing a seat in an open configuration.
Figure 12:
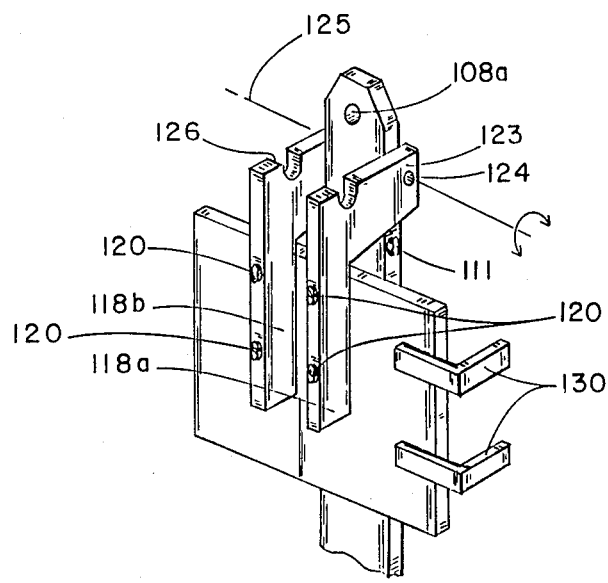
FIG. 12 is a perspective view of a portion of the hunting tree stand of FIG. 6, showing the seat in a closed configuration; and, FIG. 13 is a partial perspective view of a portion of the seat used in the embodiment of FIG. 6 attached to a short beam member.

Seat 104 is constructed in a similar fashion to the seat 23 in the first embodiment and is preferably padded. The padded seat 104 has a substantially rectangular shape, comprising two side edges 104a, 104b, a front edge 104c, and a rear edge 104d, a top surface 104e, and a bottom surface 104f. A pair of seat frames 118a, 118b, preferably manufactured from extruded aluminum, are secured to the bottom surface 104f of the seat 104 using any suitable securing means, such as bolts 120. The two seat frames 118a and 118b are positioned parallel to the seat side edges 104a, 104b. The distance D between the seat frames 118a and 118b is selected to be slightly greater than the width of the vertical back member 102 (i.e, the distance separating edge 102a and 102b). At their proximal ends, the seat frames 118a, 118b have upwardly extending bosses 122a, 122b respectively. A hole is created through the sides of the bosses 122a, 122b proximate a first end 123a, and 123b. A securing bolt/wingnut 124 is placed through these holes and through the seat attachment hole 109a to pivotally attach the seat 104 to the vertical back member 102. Thus, the seat pivots about an axis 125 (FIGS. 11 and 12). An open end slot 126 formed in the lower portion of the bosses 122a, 122b engages the bolts 111, to permit the seat 104 to be positioned in a horizontal position while allowing the seat 104 to be pivoted upwardly.

A pair of laterally spaced-apart L-shaped angle irons 130 are secured by screws or other fastening means to the bottom surface 104f of the seat 104 proximate a side edge 104a or 104b to support a rifle or bow.

Footrest 106 (FIG. 8) comprises a base 132 having a front edge 132a, a rear edge 132b, two tapered sides 132c, 132d, a top surface 132e and a bottom surface 132f. A U-shaped bracket 134 (FIG. 6) is secured to the bottom surface 132f of the base 132 proximate the front edge 132a by screws 136 or other securing means. The length L of the U-shaped bracket 134 is chosen to be slightly longer than the width of the base 132 so that ends 135a, 135b of the U-shaped bracket 134 project upwardly. A pair of footrest frames 138 are positioned perpendicular to the U-shaped bracket 134 (FIGS. 8 & 9) on the bottom surface 132f of the base 132. One end of the footrest frames 138 are preferably positioned over the U-shaped bracket 134, while the free end of the footrest frames 138 extend out past the rear edge 132b of the base 132. The footrest frames 138 are secured to the base 132 using screws 140. As with the seat frames 118, the footrest frames 138 are spaced apart from each other a slightly greater distance than the width of the vertical back member 102. Holes 142a, 142b are placed in the footrest frame 138 proximate its free end to permit a screw 144 and wingnut 146 to be placed therethrough for pivotally securing the free end of the footrest frame 138 proximate the second edge 102d of the back member 102.

A pair of support braces 148a, 148b bridge the footrest 106 and back member 102. First ends of support braces 148a, 148b are pivotally secured by screws and nuts 150 to the ends 135 of the U-shaped bracket 134. The remaining ends of the support braces 148a, 148b are similarly pivotally secured (by screws 152) to the first and second sides 102a, 102b of the vertical back member 102 proximate the bottom of the seat frames 118a, 118b.

A pair of T-handle screws 154, are retained beneath the base 132 in retaining pockets 156. The screws 154 are inserted through the back member openings 108a, 108b of the support member 102 and screwed into a tree 180 to secure the hunting tree stand 100 to the tree 180.

In an open or utilization configuration, screw 144 is inserted through the hole 142a of the footrest frame 138, through the footrest attaching hole 109b, and through the hole 142b of the footrest frame 138 for engagement the wingnut 146. The footrest is then positioned in a horizontal plane. Seat 104 is pivoted over the back member 102 (FIGS. 11 & 12) about axis 125 until the open end slots 126 in the bosses 122a, 122b engage the stopping means 111, whereat that the seat is also positioned in a horizontal plane. The vertical back member 102 is held against a tree at the desired height by the T-handle screws (FIG. 7) which are inserted through the back member openings 108a, 108b and screwed into the tree 180. Belt 110 encircles the tree trunk for extra protection and is secured with buckle 112. A hunter may then sit in the seat 100 while he waits for his prey.

Figure 9:
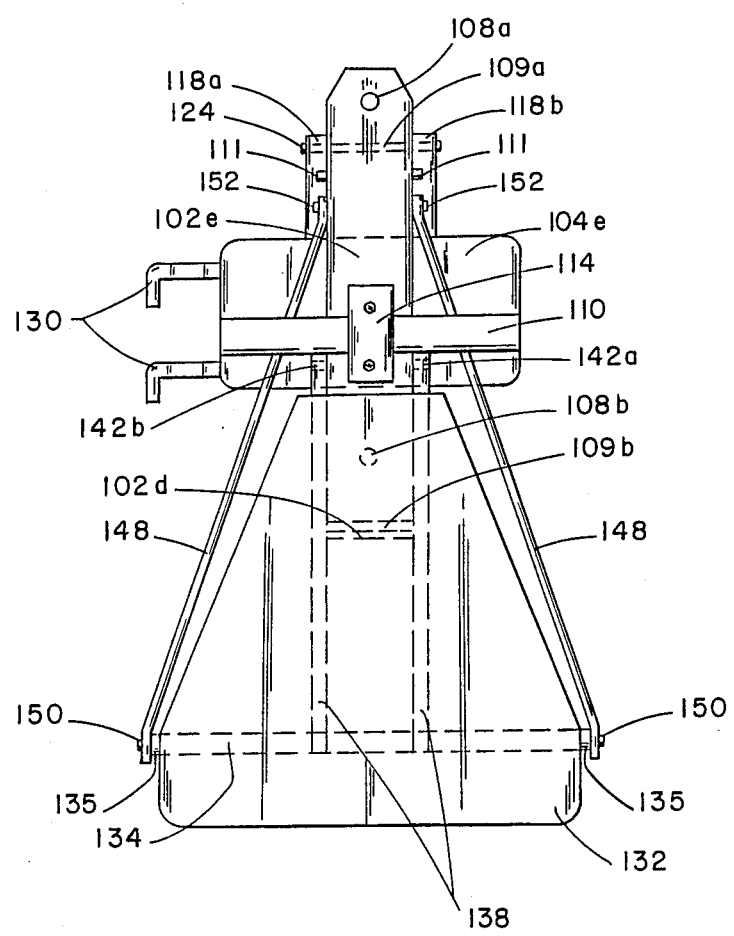
FIG. 9 is a front view of a hunting tree stand the embodiment of FIG. 6 in a folded condition.

In a closed or storage configuration, the hunting tree seat 100 is folded up as shown in FIG. 9. Once the hunting seat 100 is removed from the tree, the padded seat 104 is pivoted upwardly about axis 125 and over the vertical back member 102 until the top surface 104e of the seat 104 is proximate the inward surface 102f of the vertical back member 102. Screw 144 and wingnut 146 are then removed from the footrest 106 so that the rear edge 132b of the base 132 can travel up the vertical back member 102 until the bottom surface 132f of the base 132 is proximate the outward surface 102e of the vertical back member 102. Finally, the belt 110 is wrapped around the support braces 148 and seat 104 and tightened with the clamping buckle 112.

If desired, the seat 104 may be attached to a short beam member 190. The seat 104 is removed from the vertical back member 102 by removing the securing bolt/wingnut 124. The seat may then be attached to a short beam member 190.

Figure 13:
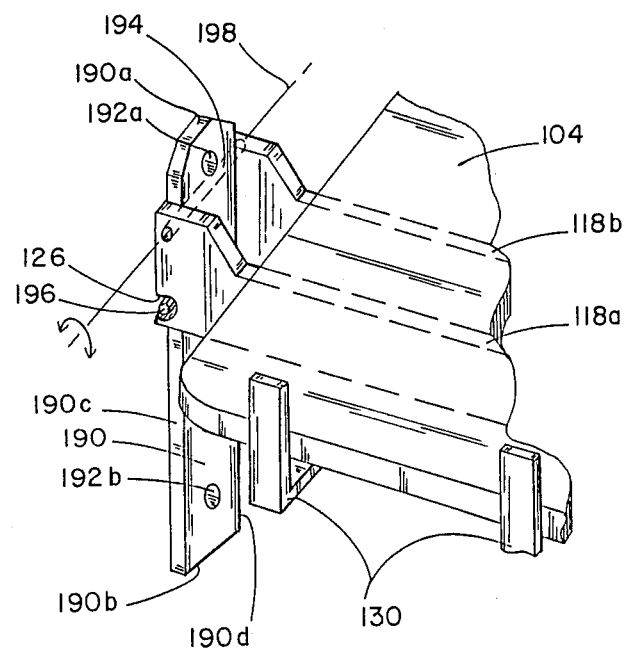

The short beam member (FIG. 13) is manufactured from any suitable material, such as aluminum extrusion. A first beam member opening 192a extends through the surface of the beam member 190 proximate a first edge 190a. Similarly, a second beam member opening 192b extends through the surface of the short beam member 190 proximate a second edge 190b. A seat attachment point, in the form of a hole 194 extends through the sides 190c, 190d of the short beam member 190. A stopping means, such as bolts 196 are provided in the sides 190c, 190d a predetermined distance below the hole 194.

The seat 104 is placed over the short beam member 190 so that the holes in bosses 122a, 122b are aligned with the seat attachment point 194. The securing bolt/wingnut 124 is then inserted through the openings so that the seat can pivot about an axis 198. The seat 104 pivots about the axis 198 until the open end slots 126 in the bosses 122a, 122b engage the stopping means 111, whereat the seat is positioned in a horizontal plane. The beam member 190 is held against a tree at the desired height by the T-handle screws 154 which are insertd through the first and second beam member openings 192a, 192b of the beam member 192 and screwed into the tree.

In a storage configuration, the seat 104 is pivoted upward about axis 198 until the seat 104 is essentially parallel to the short beam member 190. The seat may then be compactly stored or transported.

Figure 10:
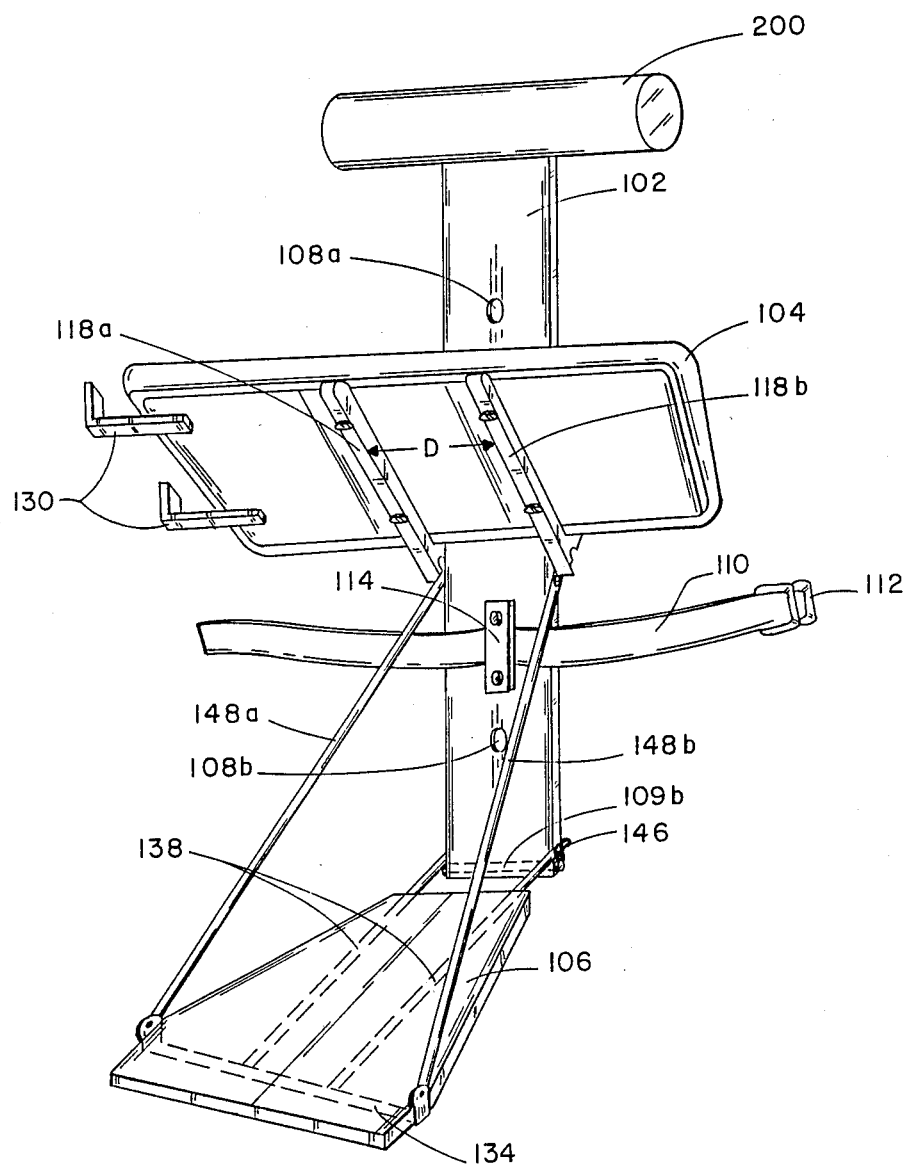
FIG. 10 is a front perspective view of a hunting tree stand according to a third embodiment of the invention.

A third embodiment (shown in FIG. 10) is similar to the second embodiment except for the elongation of the vertical back member 102 and the addition of a back rest 200. The back rest is then secured, such as with screws (unillustrated), to the outward surface 102e of the vertical back member 102 proximate the first edge 102c.

Figure 14:
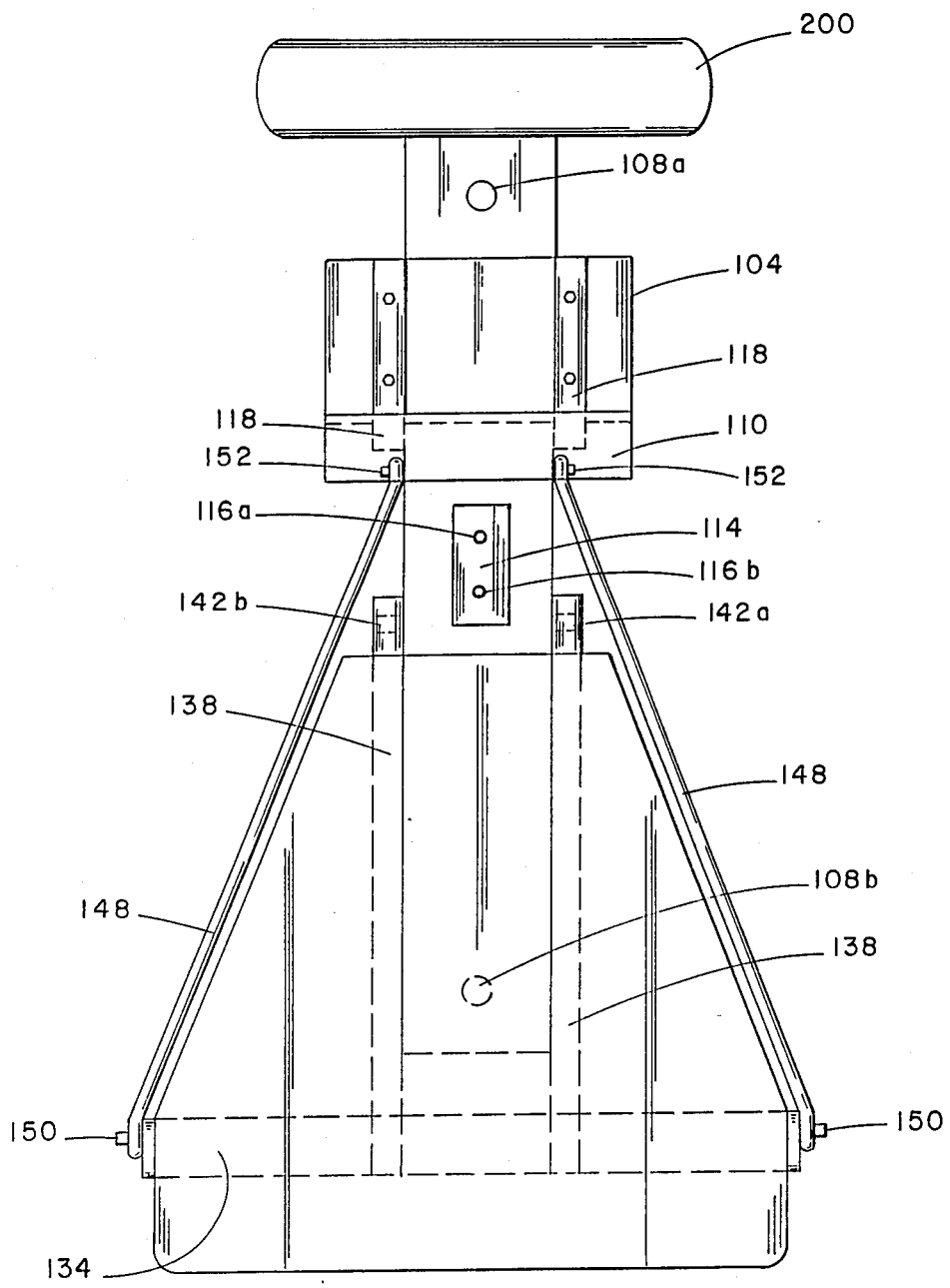
FIG. 14 is a front view of a hunting tree stand of the embodiment of FIG. 10 in a folded condition.

When storing the third embodiment (See FIG. 14), the footrest 106 is folded as described in the second embodiment. The seat 104 is pivoted upwardly about the axis 125 until the seat 104 is proximate the vertical back member 102. A wrench or other similar instrument is used to loosen the screws 116a, 116b on the clamp member 114 so that the belt 110 may be withdrawn. The belt 110 is then wrapped around the seat 104, the back member 102, and either the footrest frames 138 or the support braces 148. The ends of the belt 110 are finally secured with the belt clamping buckle 112.

While the invention as been particularly shown and described with reference to the preferred embodiments thereof, it will be understood by those skilled in the art that various alterations in form and detail may be made without department from the spirit and scope of the invention.

The embodiments of the invention in which an exclusive property or privilege is claimed are defined as follows:

1. A portable foldable tree stand upon which a hunter may be seated, comprising:
    (a) a vertical rigid back member for positioning against a tree, said back member including a back member opening for receiving fastening means for securing said back member to said tree;
    (b) a pivotally mounted seat, said seat being mounted on said back member in a manner whereby said seat may travel over a first edge of said back member as said seat pivots about an axis; and
    (c) a foldable footrest means having a rear edge selectively connectable proximate a second edge of said back member, said footrest means having a rigid support brace, one end of said support brace being pivotally connectable to said footrest means and the remaining end of said brace being pivotally connectable to said vertical back member, said footrest being foldable to a storage configuration by detaching said rear edge of said footrest means from said back member and sliding said rear edge of said footrest means upwardly towards said first edge of said back member such that said footrest means pivots with respect to its connection to said support brace until a bottom surface of said footrest is substantially parallel to and proximate said back member.

2. A portable, foldable tree stand as recited in claim 1 wherein said fastening means comprises a threaded screw.

3. A portable, foldable tree stand as recited in claim 1 wherein said footrest means includes a retaining pocket for retaining said fastening means when said fastening means is not used.

4. A portable tree stand upon which a hunter may be seated when said stand is in an open configuration and which a hunter may fold up in a closed configuration, said tree stand comprising:
   (a) a rigid back support member which is positionable against a tree, said back support member having an outer surface and an inner surface;
   (b) seat means pivotally connected to said back support member at a point intermediate the length of said back support member whereby (1) said seat means is adapted to support a hunter in a seated position when pivoted about an axis to a horizontal position when in said open configuration, and whereby (2) said seat means is adapted to pivot about said axis to an essentially vertical position when in said closed configuration, said pivotal connection point being chosen so that said seat means pivots from said outer surface of said back member to said inner surface of said back member as said seat means pivots about said axis from an open configurtation to a closed configuration;
   (c) foldable footrest means comprising (i) a base having two side edges, a front edge and a back edge; (ii) a footrest frame, one end of said footrest frame being secured to said base and the remaining end of said footrest frame being selectively connectable to said vertical back member; (iii) a rigid support brace, one end of said support brace being pivotally connectable to said base and the other end of said brace being pivotally connectable to said back support member; said footrest means (1) being adaptable to depend horizontally from said back support member when in said open configuration; and (2) being adaptable to depend in a planar configuration essentially parallel to said back support member when in said closed configuration by detaching said footrest frame from said vertical back member and sliding said back edge of said base upwardly towards said seat means such that said base pivots about its connection to said support brace; and
   (d) means for securing said tree stand to a tree.

5. A portable, foldable tree stand as recited in claim 4 wherein said footrest includes a retaining pocket for retaining said fastening means when said fastening means is not used.

* * * * *